(12) United States Patent
Coleman

(10) Patent No.: US 10,473,216 B2
(45) Date of Patent: Nov. 12, 2019

(54) PISTON SEAL

(71) Applicant: WESTPORT POWER INC., Vancouver (CA)

(72) Inventor: Timothy S. Coleman, Coquitlam (CA)

(73) Assignee: WESTPORT POWER INC., Vancouver (CA)

( * ) Notice: Subject to any disclaimer, the term of this patent is extended or adjusted under 35 U.S.C. 154(b) by 202 days.

(21) Appl. No.: 15/126,379

(22) PCT Filed: Mar. 9, 2015

(86) PCT No.: PCT/CA2015/050176
§ 371 (c)(1),
(2) Date: Sep. 15, 2016

(87) PCT Pub. No.: WO2015/139126
PCT Pub. Date: Sep. 24, 2015

(65) Prior Publication Data
US 2017/0082196 A1    Mar. 23, 2017

(30) Foreign Application Priority Data

Mar. 18, 2014  (CA) .................... 2847376

(51) Int. Cl.
*F16J 9/14*      (2006.01)
*F04B 53/14*     (2006.01)

(52) U.S. Cl.
CPC ............... *F16J 9/14* (2013.01); *F04B 53/143* (2013.01)

(58) Field of Classification Search
CPC ......... F16J 9/12; F16J 9/14; F16J 9/20; F04B 53/143
(Continued)

(56) References Cited

U.S. PATENT DOCUMENTS

| 1,452,645 A | 4/1923 | Klein |
| 5,087,057 A | 2/1992 | Kurkowski |

(Continued)

FOREIGN PATENT DOCUMENTS

| CN | 2692363 Y | 4/2005 |
| CN | 2837621 Y | 11/2006 |

(Continued)

OTHER PUBLICATIONS

International Search Report, dated May 14, 2015, for International Application No. PCT/CA2015/050176, 7 pages.
(Continued)

*Primary Examiner* — Michael Leslie
*Assistant Examiner* — Daniel S Collins
(74) *Attorney, Agent, or Firm* — Seed IP Law Group LLP

(57) ABSTRACT

A piston seal for a reciprocating piston is disclosed having the shape of split ring comprising a first end segment and a second end segment overlapping along a split surface that extends from the inner circumferential surface to the outer circumferential surface of the seal and is transverse to the direction in which the 5 piston moves when reciprocating in a cylinder bore. The split surface is spaced further from the leading lateral surface of the seal that faces a compression chamber associated with the piston than it is spaced from said trailing lateral surface of the seal that is opposite to the leading lateral surface.

20 Claims, 4 Drawing Sheets

(58) Field of Classification Search
USPC .......................................................... 92/248
See application file for complete search history.

(56) References Cited

U.S. PATENT DOCUMENTS

| | | | | |
|---|---|---|---|---|
| 5,934,685 A | * | 8/1999 | Danzer | F16J 9/14 |
| | | | | 277/498 |
| 6,305,265 B1 | * | 10/2001 | Bingham | F04B 15/08 |
| | | | | 277/452 |

FOREIGN PATENT DOCUMENTS

| | | |
|---|---|---|
| JP | 2007-309376 A | 11/2007 |
| JP | 2013-151995 A | 8/2013 |
| WO | 97/11295 A1 | 3/1997 |

OTHER PUBLICATIONS

Extended European Search Report, dated Feb. 16, 2018, for European Application No. 15765703.2-1015 / 3126718 PCT/CA2015050176, 26 pages.

Chinese First Office Action, dated Nov. 3, 2017, for Chinese Application No. 201580014496.0, 21 pages. (with English Machine Translation).

Chinese Search Report, dated Oct. 25, 2017, for Chinese Application No. 201580014496.0, 4 pages. (with English Machine Translation).

Office Action dated Jul. 3, 2018, for corresponding Chinese Application No. 201580014496.0, and English translation thereof (18 pages).

Communication pursuant to Article 94(3) EPC, dated Mar. 29, 2019, for European Application No. 15 765 703.2-1015, 6 pages.

\* cited by examiner

PISTON SEAL

TECHNICAL FIELD

The present disclosure relates to a piston seal for a hydraulic device comprising a reciprocating piston.

BACKGROUND

Hydraulic devices such as reciprocating pumps, compressors or hydraulic drives employing a piston which has a reciprocating movement within a cylinder bore are well known in the art and have been long used for handling different fluids, either liquids or gases. Such a reciprocating pump draws the fluid to be pumped into the cylinder through the pump inlet, during the intake stroke, when the piston moves in one direction, and compresses the fluid within the cylinder when the piston moves in the opposite direction. The pressurized fluid is then discharged via the pump outlet.

Some pumps deliver fluid at high pressures, for example over 4,000 psi and some handle fluids at low temperatures. Providing an effective and reliable seal for the piston which compresses the fluid in the cylinder can be a difficult task. A piston seal prevents any fluid from the compression chamber of the cylinder from leaking past the piston during the piston's reciprocating movement. Such piston seals are subjected to substantive wear due to the piston's movement within the cylinder bore and sometimes they fail due to excessive wear and/or due to the stress caused by the pressure exerted on the seal by the fluid being compressed. Such operating conditions can be even more challenging for high pressure reciprocating pumps and/or for pumps handling cryogenic fluids.

An example of such a reciprocating pump is a pump used to deliver gaseous fuel in liquid form from a cryogenic vessel to a gaseous fuelled internal combustion engine. Such pumps are being designed to handle fluids at relatively high pressures, for example at least 4600 psi, and at low temperatures of, for example, −130 degrees Celsius or lower. Providing an effective seal for the piston of such a pump has been found to be a difficult challenge. The differences in thermal contraction coefficients of the materials from which the pump components and the seals are made can result in gaps being formed between the piston seals and the cylinder wall allowing fluid to leak from the compression chamber past the piston seals to the low pressure side of the pump.

For hydraulic devices employing a reciprocating piston in general, seal wear due to the reciprocating movement of the piston is an inherent problem. In the past, split seals have been used to address the seal wear problem. Such split seals have the shape of a ring having a cut which allows it to be installed on the piston and more importantly it allows the seal to expand to compensate for the seal wear.

Split seals, having an S-shaped cut, are known in the industry. U.S. Pat. No. 6,305,265 describes a pump apparatus comprising a piston seal assembly illustrated in FIG. 5, with each seal member having an S-shaped cut which allows it to expand slightly in the radial direction without substantially reducing the thickness of the seal.

The disadvantage of the seals that have an S-shaped cut is that the overlapping end segments of the seal can break more easily under the stress exerted by the pressure of the fluid acting on the seal from the compression chamber.

Accordingly, there is a need for a seal design that allows the seal to expand to compensate for the seal wear and at the same time provide a robust construction of the seal which reduces the risk of seal breakage under the stress exerted by the fluid pressure in the compression chamber.

SUMMARY

A ring seal is disclosed for a reciprocating piston comprising a split ring with an outer circumferential surface facing a cylinder bore, when installed in a seal groove associated with the piston and an inner circumferential surface, opposite said outer circumferential surface and facing the piston. The split ring comprises overlapping first and second end segments defining a split surface there between, the split surface being transverse to the direction in which the piston moves when reciprocating within the cylinder bore and extending from the inner circumferential surface to the outer circumferential surface of the ring seal. The first end segment is associated with a leading lateral surface of the ring seal that faces a compression chamber associated with the piston, and the second end segment is associated with a trailing lateral surface of the ring seal that is opposite to the leading lateral surface. The spacing between the split surface and the leading lateral surface is different from the spacing from the split surface and the trailing lateral surface, more specifically the split surface is spaced further from the leading lateral surface than it spaced from the trailing lateral surface.

The spacing between the split surface and the leading lateral surface is calculated based on the pressure stress applied to the ring seal during operation.

Also, the first end segment has a length which is calculated based on the pressure stress applied to the ring seal during operation. In preferred embodiments, the length of the second end segment is equal to the length of the first end segment.

In some embodiments, each of the first and second end segments has two portions which are each connected to a longitudinal portion of the respective end segment by curved corners.

In other embodiments, each of the first and second end segments has two portions which are each connected to a longitudinal portion of the respective end segment by square shaped corners.

In preferred embodiments, the spacing between the split surface and the leading lateral surface, more specifically the width of the first end segment, is ⅔ of the width of the ring.

In some embodiments the split ring can be made of a polymer material or a polymer composite.

In preferred embodiments, the spacing between the split surface and the leading lateral surface and the spacing between the split surface and the trailing lateral surface are substantially constant along the circumferential direction of the seal, more specifically the first end segment and the second end segment have a constant width.

In preferred embodiments, the split surface extends in a direction perpendicular to the inner and outer circumferential surfaces of the ring seal.

A reciprocating pump is also disclosed comprising a cylinder body having a cylinder bore and piston mounted in the cylinder bore and supported by said cylinder body, the piston being operable to move within the cylinder bore in a reciprocating motion such that it can compress a fluid in a compression chamber. The piston further comprises a ring seal installed in a piston groove such that it seals the piston's surface against a wall of the cylinder bore, the ring seal comprising a split ring with an outer circumferential surface facing the cylinder bore when the ring seal is installed in the piston groove and an inner circumferential surface, opposite the outer circumferential surface and facing the piston. The split ring comprises overlapping first and second end segments defining a split surface there between, which is transverse to the direction in which the piston moves when reciprocating within the cylinder bore. The split surface extends from the inner circumferential surface to the outer circumferential surface. The first end segment is associated with the leading lateral surface of the ring seal that faces the compression chamber, and the second end segment is associated with a trailing lateral surface of the ring seal that is opposite the first leading lateral surface. The spacing between the split surface and the leading lateral surface is different from spacing from the split surface and the trailing lateral surface and, more specifically, the split surface is spaced further from the leading lateral surface of the seal than it is spaced from the trailing lateral surface of the seal.

The spacing between the split surface and the leading lateral surface of the ring seal is calculated based on a pressure stress applied to the ring seal during operation. The first end segment of the seal has a length which is also calculated based on the pressure stress applied to the ring seal during operation. In preferred embodiments the length of the second end segment is equal to the length of the first end segment.

In some embodiments, each of the first and second end segments has two portions which are each connected to a longitudinal portion of the respective end segment by curved corners.

In other embodiments, each of the first and second end segments has two portions which are each connected to a longitudinal portion of the respective end segment by square shaped corners.

In preferred embodiments, the split surface extends in a direction perpendicular to the inner and outer circumferential surfaces of the ring seal.

The reciprocating pump comprising the present piston seal can be a pump that is designed to handle cryogenic fluids.

The reciprocating pump comprising the present piston seal can be a pump is designed to compress fluids to pressures higher than 3000 psi.

The seal can be made of a polymer or a polymer composite.

DETAILED DESCRIPTION

Figure 2:
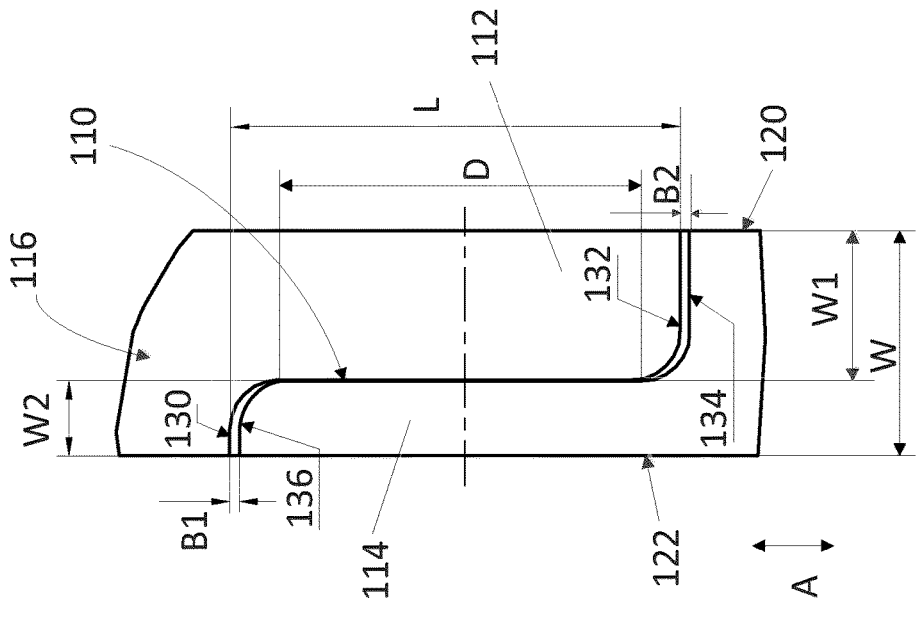
FIG. 2 is a detailed view of the S-shaped cut of the piston seal according to a first embodiment.
Figure 1:
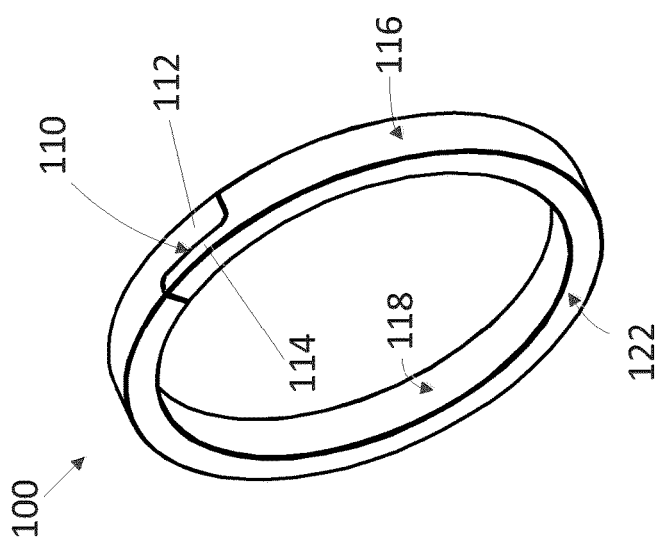
FIG. 1 is an isometric view of a piston seal which is split to define two end segments of different widths.

FIG. 1 illustrates a piston seal 100 which can be installed as a ring-type piston seal for the piston of a reciprocating pump for sealing between the surface of the piston and the wall of the cylinder bore in which the piston reciprocates to prevent any leakage from the higher pressure compression chamber, past the piston, to the low pressure side of the piston. Ring seal 100 is in the shape of a split ring which has two overlapping end segments 112 and 114 which extend in the circumferential direction (A) of the ring seal and which define a split surface 110. With reference to FIGS. 1 and 2, ring seal 100 has an outer circumferential surface 116 and an inner circumferential surface 118 and a leading lateral surface 120 and a trailing lateral surface 122 adjoining the outer and inner circumferential surfaces.

Split surface 110 extends between the outer circumferential surface 116 and inner circumferential surface 118, and is transverse to the direction in which the piston moves when reciprocating within a cylinder bore. Preferably, split surface 110 extends in a direction perpendicular to the outer and inner circumferential surfaces of the seal as illustrated in FIGS. 1 and 2. The two end segments are shaped to substantially overlap along split surface 110, preferably having substantially the same length (L). Gaps B1 and B2 are generally provided between the surfaces of the two end segments to accommodate any contraction or expansion of the seal during operation.

Split surface 110 is spaced further from leading lateral surface 120 than it is spaced from trailing lateral surface 122. The spacing between split surface 110 and leading lateral surface 120 and the spacing between split surface 110 and trailing surface 122 are preferably constant along the circumferential direction (A) of the seal, which means that first end segment 112 and second end segment 114 each have preferably a substantially constant width along their entire length. Width W1 of first end segment 112 is larger than the width W2 of the second end segment 114 and the sum of widths W1 and W2 is substantially equal to width W of the ring seal (W=W1+W2). Therefore, when the seal is initially installed in the seal groove of the piston the overlapping end segments 112 and 114 together assume substantially the same cross-section as the main body portion of the piston seal away from the split portion so that piston seal 100 is shaped as a ring having a substantially constant cross-sectional along its circumference. As the seal wears out or during operation, the seal can expand or contract due to variations in temperature, and the free ends move to relative to each other to allow such an expansion or contraction, but they continue to overlap over a substantial portion to ensure an appropriate sealing of the piston. The end segments 112 and 114 of the piston seal maintain an overlapping relationship even when piston seal 100 expands within the piston groove to the maximum allowed diameter.

Width W1 of first end segment 112 which is the spacing between split surface 110 and leading lateral surface 120 is calculated based on the pressure stress applied on the piston seal by the fluid being compressed during the pump operation. It has been found that, in general, good test results have been obtained when the width of the first end segment equals to ⅔ of the width of the piston seal (W1=⅔*W). The width of the second end segment in this case is ⅓ of the width of the piston seal (W2 =⅓*W).

Length L of end segments 112 and 114 is also calculated based on the pressure stress applied on the piston seal by the fluid being compressed during the pump operation.

In a first embodiment of the piston seal illustrated in FIG. 2, the seal is an S-cut type seal. First end segment 112 overlaps in the circumferential direction with second end segment 114 over a distance D and base 130 and tip 132 of end segment 112 have rounded corners that connect them to the longitudinal portion of end segment 112. Similarly base 134 and tip 136 of second end segment 114 have rounded corners that connect them to the longitudinal portion of end segment 114. The longitudinal portions of the end segments are the portions of the end segments that extend in the circumferential direction of the seal and that correspond to the overlapping distance D, as illustrated in FIG. 2.

Figure 3:
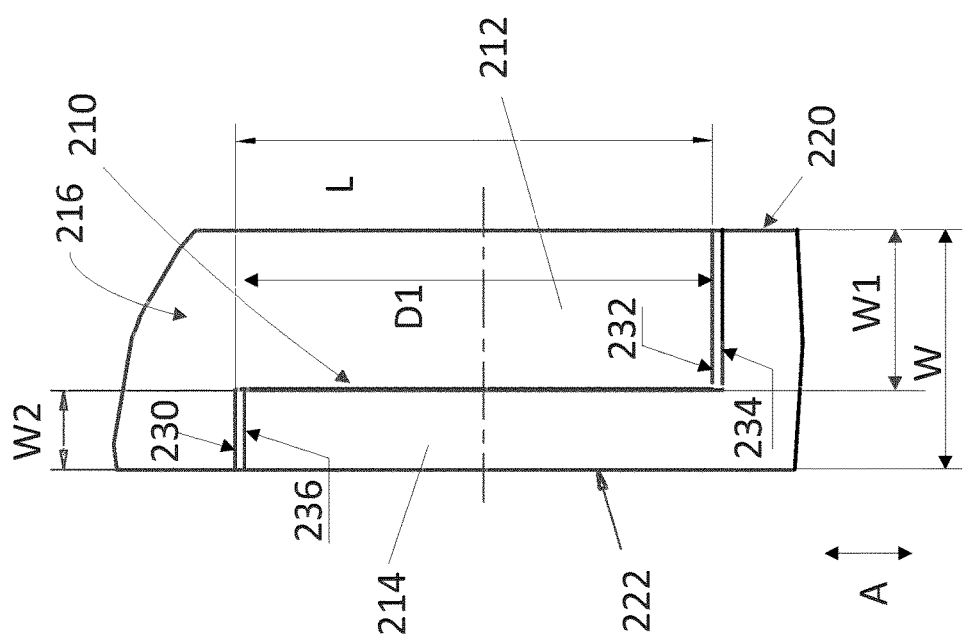
FIG. 3 is a detailed view of the Z-shaped cut of the piston seal according to a second embodiment.

In a second embodiment of the piston seal illustrated in FIG. 3, split surface 210 has a Z-shape wherein first end segment 212 overlaps in the circumferential direction with second end segment 214 over a distance D1 and the base 230 and the tip 232 of first end segment 212 and the base 234 and the tip 236 of second end segment 214 have straight corners that connect them to the longitudinal portion of the respective end segment. Outer circumferential surface 216, trailing lateral surface 222, and leading lateral surface 220 are denoted in FIG. 3, similar to FIGS. 1 and 2 representations. The longitudinal portions of the end segments are the portions that extend in the circumferential direction of the seal and that correspond to the overlapping distance $D_1$, as illustrated in FIG. 3.

The present ring seal is suitable for use in reciprocating pumps used for pumping cryogenic fluids at high pressures, for example for pumps that deliver cryogenic fluids at pressures higher than 3000 psi. The present ring seal can be used for example in a reciprocating pump which delivers liquid natural gas (LNG) to the supply system of a gaseous fuelled internal combustion engine. It will be understood that the present ring seal has numerous other applications, for example it can be used in reciprocating pumps that handle liquids or gases at different pressures and temperatures. Such pumps can comprise only one ring seal for sealing the piston against the wall of the cylinder bore or a plurality of ring seals of the same configuration, arranged in series. At higher pressures, series of seals is preferred because they can provide a better sealing, but at lower pressures, one seal can provide sufficient sealing to maintain pumping efficiency with less friction.

Figure 4:
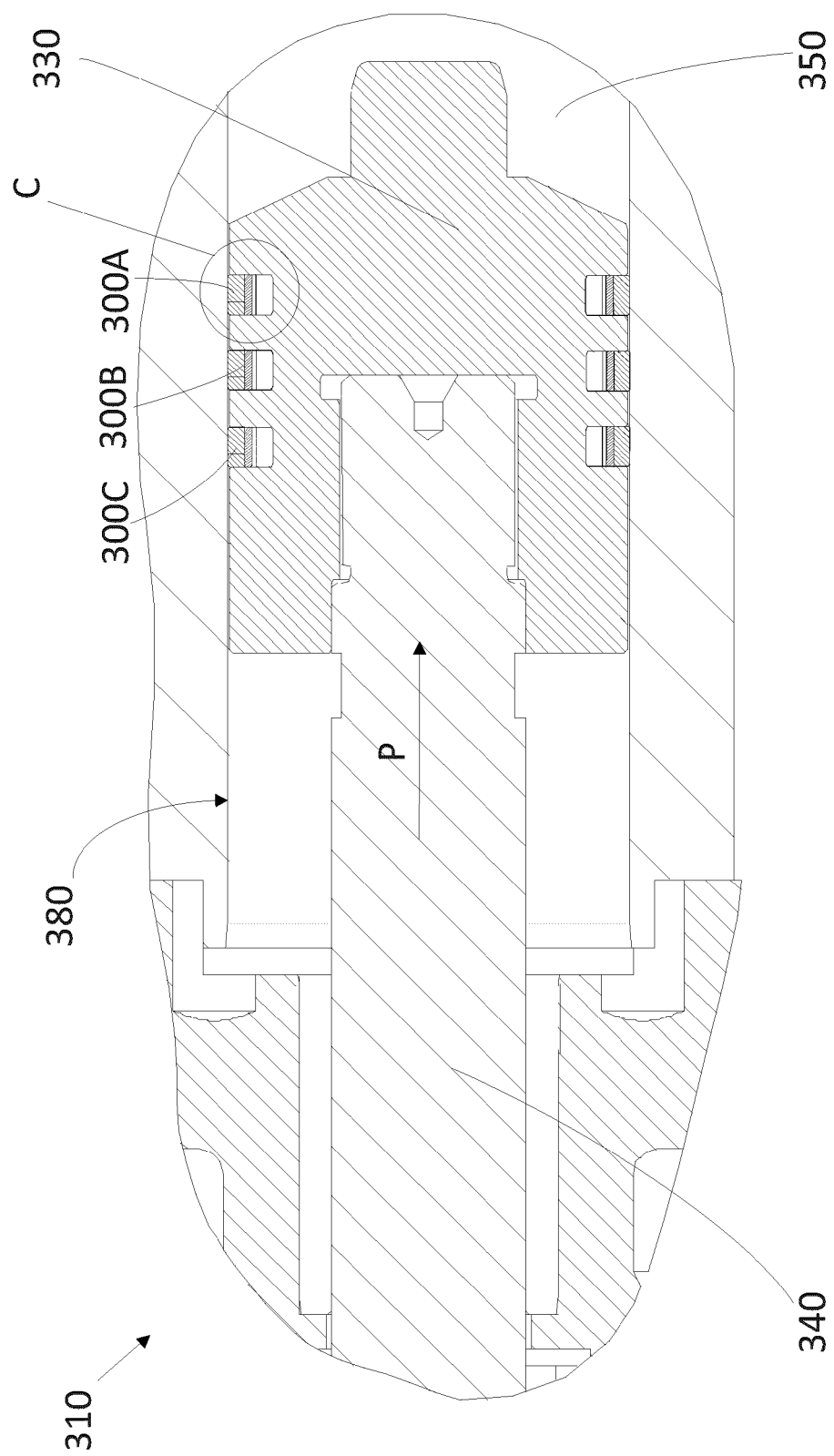
FIG. 4 is a cross-sectional view taken through a piston mounted in a reciprocating pump, the piston being sealed against the cylinder wall of the pump through a series of seals, each seal having a configuration as illustrated in the first or second embodiment.

A high pressure reciprocating pump comprising a series of ring seals is illustrated in FIG. 4. Pump 310 comprises a cylinder bore 380, defined by the body of the pump, and a piston 330 which is actuated by an actuating mechanism through a shaft 340 in a reciprocating movement within cylinder bore 380 such that when the piston moves in direction P it compresses a fluid within a compression chamber 350 during the compression stroke of the pump. Piston 330 comprises a series of any number of seals, for example three ring seals 300A, 300B and 300C. Each ring seal can have a split configuration as illustrated in FIGS. 1 through 3 and further detailed in FIG. 5 which shows a cross-sectional view through a ring seal 300A having a configuration similar to the seals of the first or second embodiment, the seal being placed in the seal groove of the piston. It is understood that, in preferred embodiments, the rest of the seals in the series, 300B and 300C have a similar configuration and are installed in a similar way as seal 300A. In the illustrated embodiment, ring seal 300A is positioned in a piston groove 360 and is supported by an energizer 370 which pushes the seal in close engagement with the cylinder wall for a better sealing. In preferred embodiments, energizer 370 is a metal ring.

Figure 5:
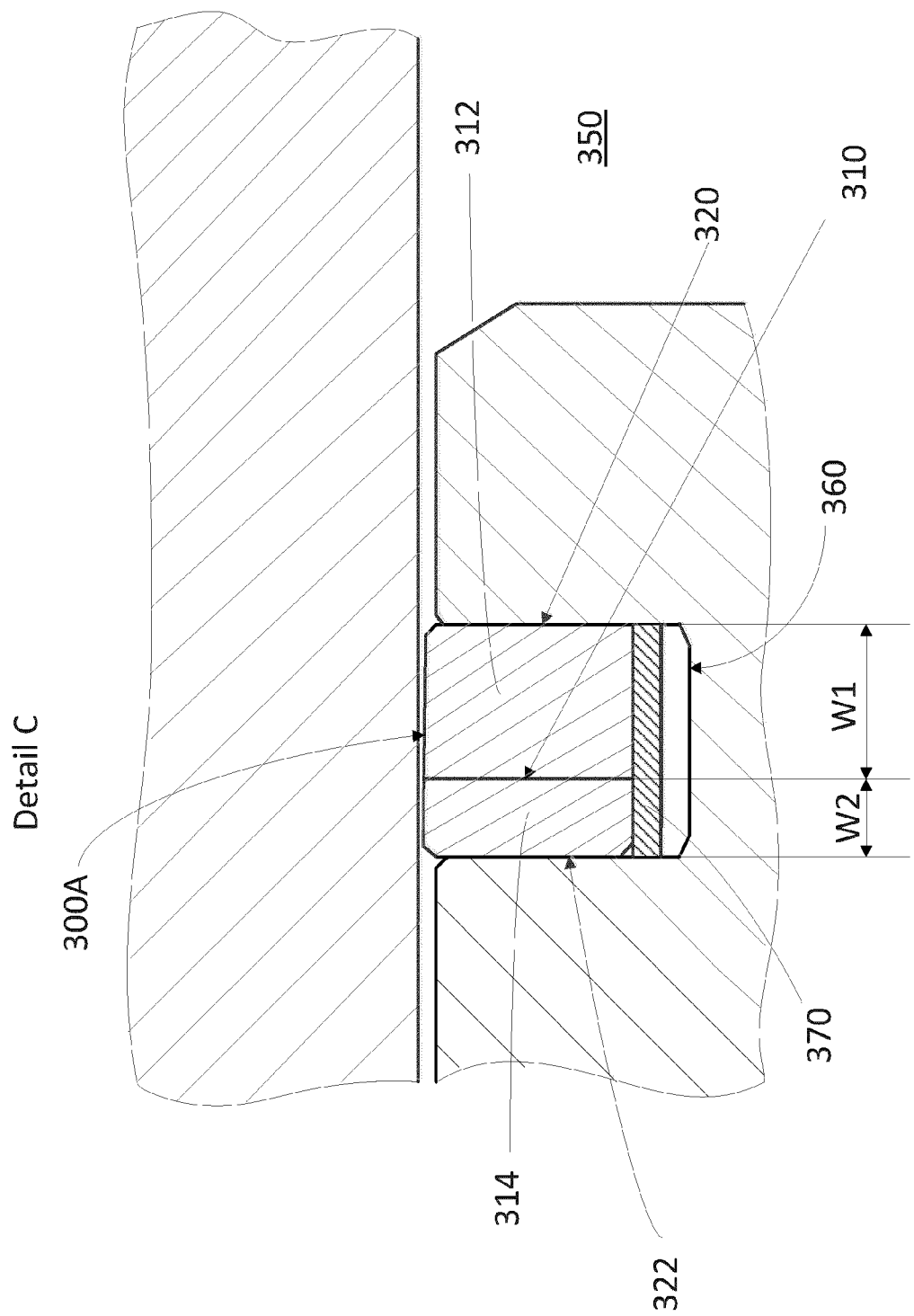
FIG. 5 is a detailed cross-sectional view taken through a seal of a split configuration as illustrated in the first and second embodiment, the seal being placed in a groove of a pump piston.

Seal 300 comprises two end segments, a first end segment 312 and a second end segment 314, which overlap along a split surface 310 and each have a width that is smaller than the width of the main body of the seal. As illustrated in FIG. 5 ring seal 300 is installed in groove 360 such that split surface 310 is spaced further from leading lateral surface 320, which faces the higher pressure combustion chamber 350, than it is from trailing lateral surface 322, which faces the opposite side of the piston, which means that first end segment 312 which faces the wall of the groove that is closer to compression chamber 350 has a larger width $W_1$. During the compression stroke of the pump, first end segment 312 and second end segment 314 have to withstand the compression stresses exerted by the pressurized fluid from compression chamber 350. The widths and the lengths of first end segment 312 and second end segment 314 are calculated based on the operational condition of the pump and the known fluid pressures that develop in the compression chamber. It has been found that while both end segments 312 and 314 are subjected to a portion of the stresses exerted by the pressurized fluid, first end segment 312, being the segment that is first exposed to the pressurized fluid in the compression chamber 350 has to withstand the larger portion of such stresses. Accordingly, the increased width of first end segment 312 reduces the risk of seal failures during pump operation.

It has been found that for example, for a reciprocating pump used for pressurizing liquid natural gas at pressures of about 32 MPa (4600 psi), if the piston seal is made of a polymer material or polymer composite, for example, UHMW-PE (ultrahigh molecular weight polyethylene) or bronze filled PTFE (polytetrafluoroethylene) it is advantageous if the width W1 of the first end segment is ⅔ of the width of the main portion of the piston seal (W). It will be understood that for different reciprocating pumps, different operating conditions and different seal materials the ratio between the width of the first end segment and the width of the main portion of the piston seal can be different. However, in accordance with the teachings of this disclosure, it is hereby taught that it is advantageous if the width of the first end segment, which is closer to the pump compression chamber, is larger than the width of the second end segment which is further from the pump compression chamber.

The present piston seal presents advantages over the split seals described in the prior art through increased durability without having to modify the overall dimensions of the seal. In the past, attempts to improve the seal durability have led to an increased overall width of the seal.

The present invention has been described with regard to a plurality of illustrative embodiments. However, it will be apparent to persons skilled in the art that a number of variations and modifications can be made without departing from the scope of the invention as defined in the claims.

I claim:

1. A ring seal for a reciprocating piston comprising a split ring with an outer circumferential surface defining a width of said split ring which forms a seal with a cylinder bore when installed in a seal groove associated with said piston and an inner circumferential surface, opposite said outer circumferential surface and facing said piston, said split ring comprising overlapping first and second end segments defining a split substantially flat surface there between, said split surface being transverse to the direction in which said piston moves when reciprocating within said cylinder bore and extending from said inner circumferential surface to said outer circumferential surface wherein said first end segment is associated with a leading lateral surface of said ring seal that faces a compression chamber associated with said piston, and said second end segment is associated with a trailing lateral surface of said ring seal that is opposite to said leading lateral surface, wherein spacing between said split surface and said leading lateral surface is approximately ⅔ of the width of said split ring, wherein said spacing between said split surface and said leading lateral surface reduces the risk of failure of said ring seal during operation.

2. The ring seal of claim 1 wherein said spacing between said split surface and said leading lateral surface reduces a risk of breakage of the ring seal due to stress exerted by a pressurized fluid on said ring seal during operation.

3. The ring seal of claim 1 wherein said first end segment has a length which reduces a risk of breakage of said ring seal due to stress exerted by a pressurized fluid on said ring seal during operation.

4. The ring seal of claim 1 wherein said split ring is made of a polymer composite.

5. The ring seal of claim 1 wherein said spacing between said split surface and said leading lateral surface and said spacing between said split surface and said trailing lateral surface are substantially constant along the circumferential direction of said seal.

6. The ring seal of claim 1 wherein said split surface extends in a direction perpendicular to said inner and outer circumferential surfaces of said ring seal.

7. A reciprocating pump for pumping a cryogenic fluid, the pump comprising a cylinder body having a cylinder bore and piston mounted in said cylinder bore and supported by said cylinder body, said piston being operable to move within said cylinder bore in a reciprocating motion such that it can compress the cryogenic fluid in a compression chamber of said cylinder bore, said piston further comprising a ring seal installed in a piston groove associated with said piston such that it seals said piston's surface against a wall of said cylinder bore, said ring seal comprising a split ring with an outer substantially flat circumferential surface facing said cylinder bore when said ring seal is installed in said piston groove and an inner circumferential surface, opposite said outer circumferential surface and facing said piston, said split ring comprising overlapping first and second end segments defining a split substantially flat surface there between, said split surface being transverse to the direction in which said piston moves when reciprocating within said cylinder bore and extending from said inner circumferential surface to said outer circumferential surface, wherein said first end segment is associated with a leading lateral surface of said ring seal that faces said compression chamber, the first segment subjected to a larger portion of stress exerted by the pressurized cryogenic fluid within the compression chamber compared to the stress exerted by the pressurized cryogenic fluid in the compression chamber on said second end segment, and said second end segment is associated with a trailing lateral surface of said ring seal that is opposite said first leading lateral surface, and wherein said split surface is spaced further from said leading lateral surface than it is spaced from said trailing lateral surface.

8. The reciprocating pump of claim 7 wherein said spacing between said split surface and said leading lateral surface reduces a risk of breakage of the ring seal due to the stress exerted by the pressurized cryogenic fluid on said ring seal during operation.

9. The reciprocating pump of claim 7 wherein said first end segment has a length which reduces a risk of breakage of said ring seal due to stress exerted by the pressurized cryogenic fluid during operation.

10. The reciprocating pump of claim 7 wherein said split surface extends in a direction perpendicular to said inner and outer circumferential surfaces of said ring seal.

11. The reciprocating pump of claim 7 wherein said ring seal is made of polymer.

12. The reciprocating pump of claim 7 wherein said ring seal is made of a polymer composite.

13. The reciprocating pump of claim 7 wherein said pump is designed to compress fluids to pressures higher than 3000 psi.

14. The ring seal of claim 1 wherein gaps B1 and B2 are provided between the surface of the first end segment and the surface of the second end segment to accommodate any contraction or expansion of the seal during operation.

15. The reciprocating pump of claim 7 wherein gaps B1 and B2 are provided between the surface of the first end segment and the surface of the second end segment to accommodate any contraction or expansion of the seal during operation.

16. The ring seal of claim 1 wherein said split ring is made of an ultrahigh molecular weight polyethylene.

17. The ring seal of claim 1 wherein said split ring is made of bronze filled poly tetrafluoroethylene.

18. The ring seal of claim 7 wherein said split ring is made of an ultrahigh molecular weight polyethylene.

19. The ring seal of claim 7 wherein said split ring is made of bronze filled poly tetrafluoroethylene.

20. A ring seal for a reciprocating piston of a cryogenic fluid pump, the ring seal comprising a polymer split ring with an outer circumferential surface defining a width of said split ring which forms a seal with a cylinder bore when installed in a seal groove associated with said piston and an inner circumferential surface, opposite said outer circumferential surface and facing said piston, said split ring comprising overlapping first and second end segments defining a split substantially flat surface there between, said split surface being transverse to the direction in which said piston moves when reciprocating within said cylinder bore and extending from said inner circumferential surface to said outer circumferential surface wherein said first end segment is associated with a leading lateral surface of said ring seal that faces a compression chamber associated with said piston, and said second end segment is associated with a trailing lateral surface of said ring seal that is opposite to said leading lateral surface, wherein said split surface is spaced further from said leading lateral surface than it is spaced from said trailing lateral surface to reduce the risk of breakage of said ring seal due to pressure exerted by a compressed fluid on said ring seal during operation.

* * * * *